United States Patent [19]

Hertzberg et al.

[11] 3,859,520

[45] Jan. 7, 1975

[54] OPTICAL DETECTION SYSTEM

[75] Inventors: Martin Hertzberg, Pittsburgh; Charles D. Litton, McMurray; John N. Murphy; H. Kenneth Sacks, both of Pittsburgh, all of Pa.

[73] Assignee: The United States of America as represented by the Secretary of the Interior, Washington, D.C.

[22] Filed: Jan. 17, 1974

[21] Appl. No.: 434,162

[52] U.S. Cl.................. 250/209, 250/226, 250/372
[51] Int. Cl............................. G01j 3/34, G01j 3/50
[58] Field of Search .......... 250/226, 209, 573, 372, 250/339

[56] References Cited
UNITED STATES PATENTS
3,482,637  12/1969  Mitchell et al...................... 250/372
3,755,680  8/1973   Smith................................. 250/226

*Primary Examiner*—James W. Lawrence
*Assistant Examiner*—T. N. Grigsby
*Attorney, Agent, or Firm*—Thomas Zack; Frank A. Lukasik

[57] ABSTRACT

A method and a system for detecting the spectral radiant energy which is characteristic of an explosion or fire. The disclosed example uses methane-air ignitions which are analyzed by first determining their particular spectral radiance and comparing it with background irradiance from stray and ambient sources. Optimum spectral ranges which indicate the characteristic signature for an explosion or fire from the methane-air ignitions are determined and a plurality of suitable optical detectors are selected for the ranges involved. When preselected combinations of values of ranges are sensed, circuitry is then activated to signal the occurrence of the methane-air ignitions. Two embodiments of circuitry are disclosed, one of which uses logic gates and the other a bridge of optical detectors. Should the invention be used in a coal mine environment, the actuated signal can be used to trigger a quenching mechanism located near the ignition point.

The simplified embodiment of the circuitry which employs a bridge circuit, has three detectors in their branches and a fourth element. Each detector is optically filtered. In this way one detector is responsive only to the center emission peak, and the other two respond to side bands where there is no emission from the fire or explosion. The fourth element is masked and does not respond to any radiant energy. When the bridge becomes unbalanced, indicating the occurrence of a sensed explosion, a triggering device can be actuated to suppress the explosion.

8 Claims, 11 Drawing Figures

OPTICAL DETECTION SYSTEM

BACKGROUND OF THE INVENTION

1. Field of the Invention

The invention is a system for detecting fires or explosions by looking at the spectral radiant energy emitted from the ignited gaseous mixture. More specifically, the energy is detected by a plurality of detectors operating over a central band region and adjacent side band regions.

2. Description of the Prior Art

In the prior art, radiant energy emitted by a fire or explosion has been detected and, if its magnitude falls within certain predetermined ranges or values, a trigger can be actuated to set in motion a suppression device or other type of mechanism. One of the areas where these types of systems should find particular value is in the coal mining industry where methane-air mixtures present a potentially hazardous situation. The U.S. Pat. No. 3,482,637 to D. W. Mitchell et all. discusses the methane hazards in coal mines and utilizes an ultraviolet detector that can be used to suppress them when a gas explosion occurs.

A key component in these explosion or fire detection systems is the detector. It must not only be rapid and sensitive in its operation, but must be fail safe. It should be able to detect the radiant energy from an actual explosion without misfirings from stray or ambient light sources. Photoelectric cells have been used to detect thermal energy in the ultraviolet, visible or near infrared as described in the Cotterman et al U.S. Pat. No. 3,281,811.

None of the known detectors employed in the prior art make use of a plurality of different detectors to simultaneously detect wave length ranges within a central selected band and two side bands. This type of procedure and apparatus insures that the radiation causing the haxard will be properly noted without false sources actuating the triggering mechanism. It does this by eliminating all combinations of readings except for those specifically associated with the characteristic signature of the gaseous ignition under observation.

The primary object of this invention is an improved detection system for explosions or fires.

A secondary object is to use such an improved detector to suppress a methane-air explosion in a coal mine.-

FIG. 1 is a detection system used to detect methane air explosions mounted on a mining machine.

FIG. 2 schematically shows the explosive wave front and detector.

FIG.3(a) is a graphical representation of the detected ultraviolet spectral radiance for methane-air explosion;

Figure 4C:
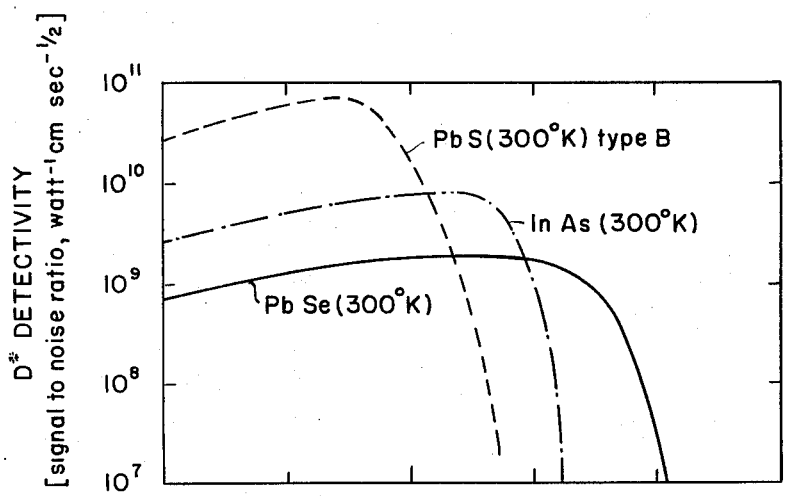
FIG.4(a) is a graph of the detected infrared spectral radiance for a given wavelength range and explosion.
FIG.4(b) is an irradiance graph of the same explosion and wavelengths.
Figure 4B:
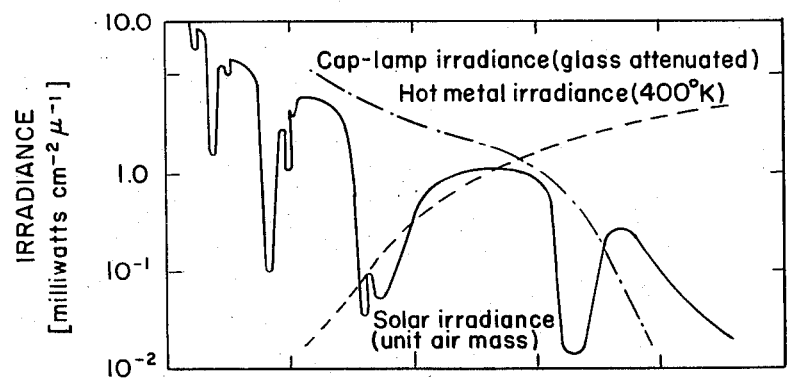
Figure 4A:
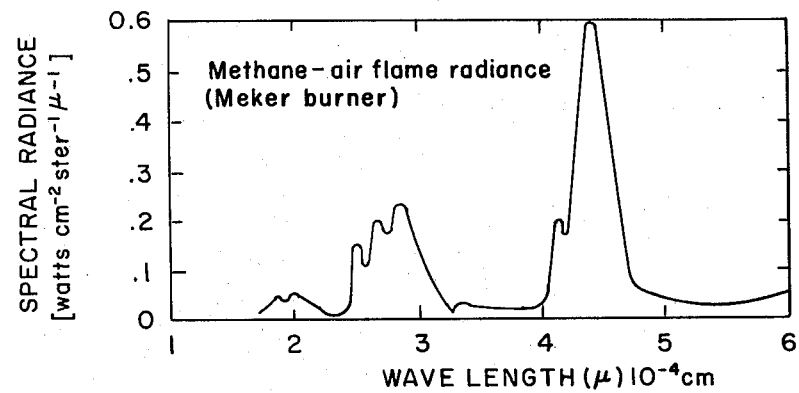

,3 FIG.4(c) graphically describes the detectors' detectivity for the same operative wavelength parameters as in FIG.4(a).

Figure 5:
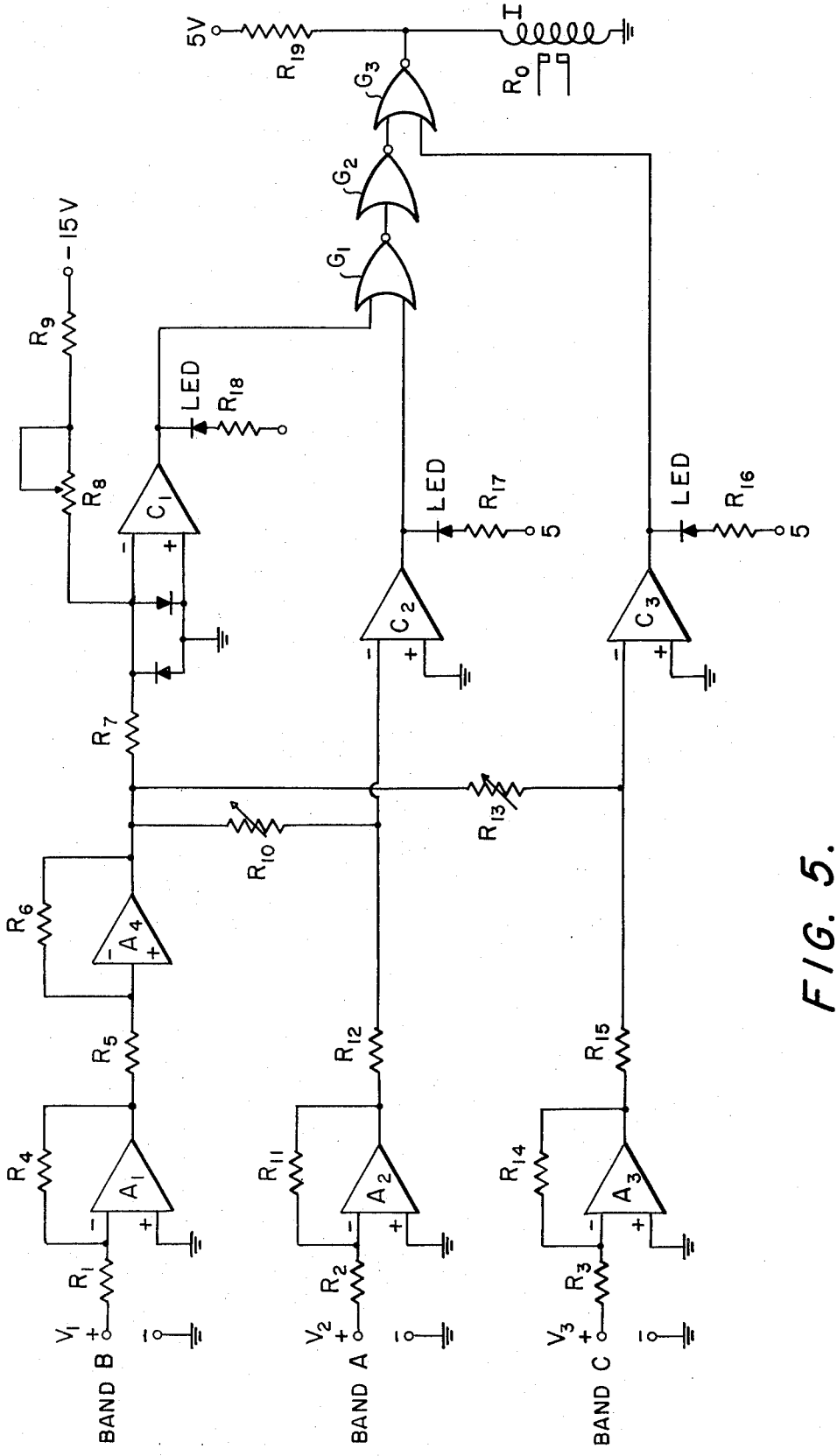

FIG. 5 shows a simplified embodiment of the detection and logic circuitry.

Figure 6:
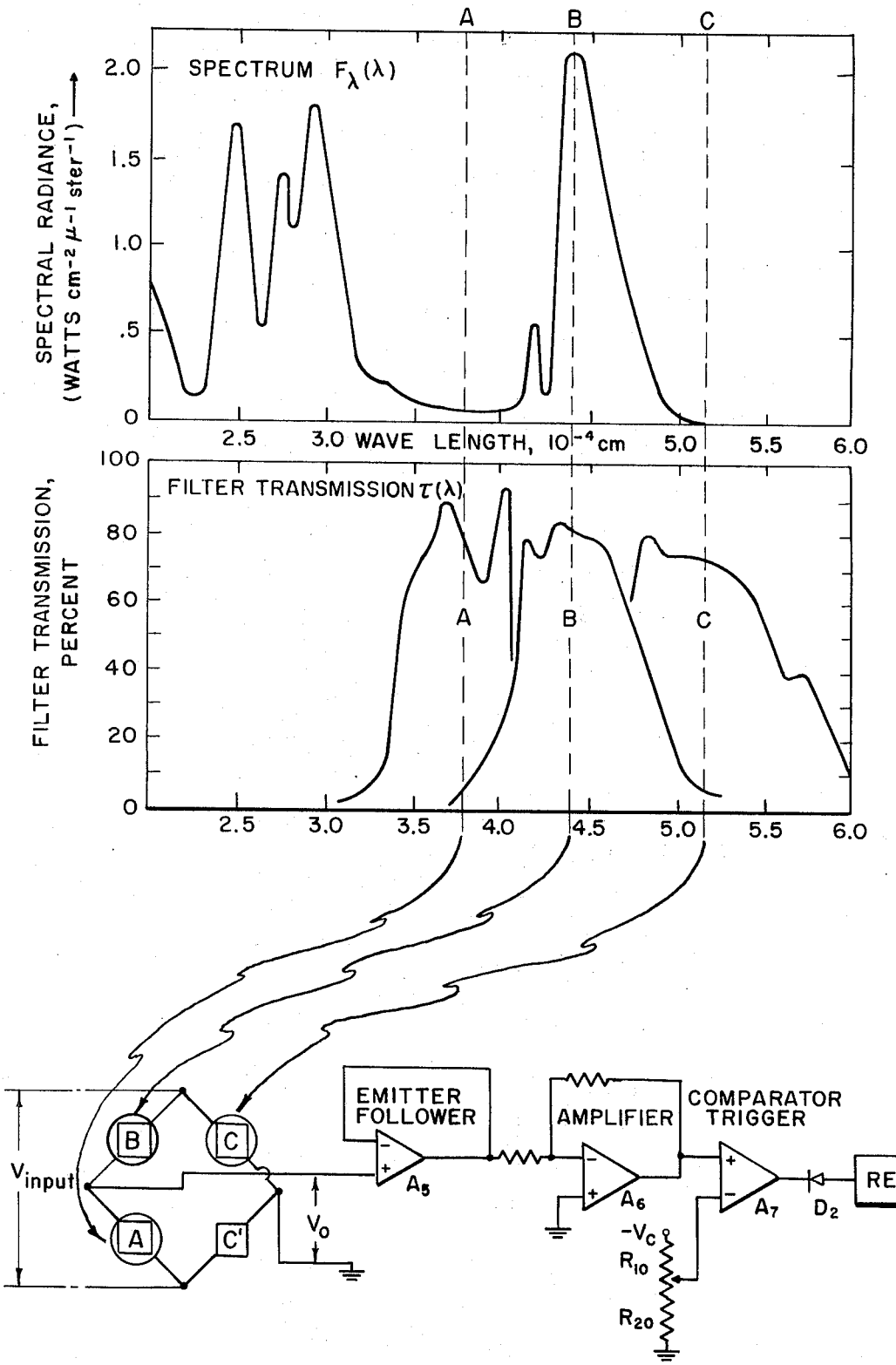

FIG. 6 is a second more sophisticated embodiment of the detector and its circuitry. The FIG. 1 system shows just one of the many possible setups for our detector system. The detector system is housed in casing $D_1$ which in turn may be attached to the front end of a continuous mining machine 1 as shown. Other variations are possible, such as those described in U.S. Pat. No. 3,684,021 to Edward J. Poitras. In the illustrated position, the detector $D_1$ can detect the explosion while in its formative stages and thereafter suppress it by sending a triggering signal to actuate a dispersal suppressor unit 3. Since this invention is concerned chiefly with the optical detection system $D_1$, the details on the suppressor unit 3 are shown only very generally in FIG. 1. Examples of units that could possibly be used are described in the mentioned patent to Poitras, U.S. Pat. No. 3,515,217 to W. B. Jamison, and the U.S. Pat. No. 3,482,637 to D. W. Mitchell et al.

As the cutting edges 5 of the mining machine rotate to cut into the coal bearing earth 7, ignitions may occur which could cause an explosion of the ambient air-methane gas. The center of this explosion would be at the ignition point 9. The explosion or flame front would expand outwardly in a wave form 11 towards the operator in the mining machine. Usually the suppressor 3 is from 1 to 5 meters (distance d in FIG. 1) from the point 9. The explosive flame speed is initially no greater than about 300 centimeters/second. To be effective, the guarding agent in the suppressor should reach the flame within 60 to 100 milliseconds. In order to insure that the quenching agent reaches the flame before it gets to the operator, the detection time ideally should be less than 20 to 40 milliseconds.

The rapid reliable detection of the methane-air explosion calls for the performance of three main tasks. First, knowledge of the spectral radiance given off by such an explosion as a function of time is needed. This requires knowledge of the nascent source intensity and the path attenuation factor between the source and the observer. From this data, it is possible for one to calculate the irradiance at the detector at a fixed distance from the source. Next, the calculated irradiance is compared to the ambient, background, or stray irradiance in the mine environment under typical and extreme conditions. Lastly, one characterizes the spectral sensitivity and response time-constants of the available optical sensors.

Figures 3B, 3C, 3D:
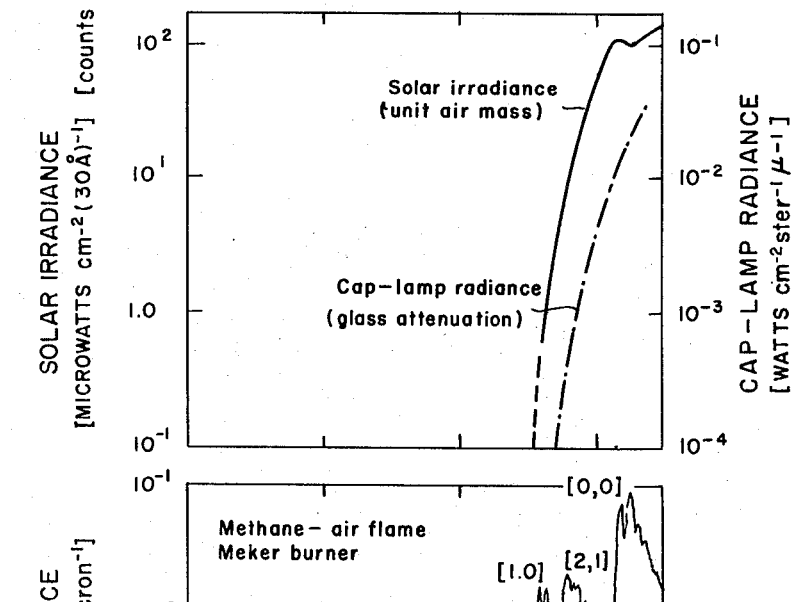
FIG.3(b) is a graph of the irradiance for the same explosion and wavelengths as in FIG.3(a)
FIG.3(c) is another graph of the same explosion and wavelengths as in FIG.3(a) illustrating the spectral responsiveness of the detectors; and ,3 FIG. 3(d) graphically sets forth the detector's sensitivity in the same wavelength range as FIG.3(c).

This procedure would yield spectral information that suggest the optical regions where the developing flame irradiance far exceeds the background or stray irradiance, and where the signal intensity from the explosion event was unmistakably distinguishable from other sources of irradiance. This characteristic signature of the explosion is what will be detected. The comparison, together with the time-constant constraints, would also suggest a triggering level, or a signal processing logic that would minimize false firings. FIGS. 3 and 4 show such a detection analagram from the ultraviolet (FIG. 3) and infrared region (FIG. 4).

Figure 2:
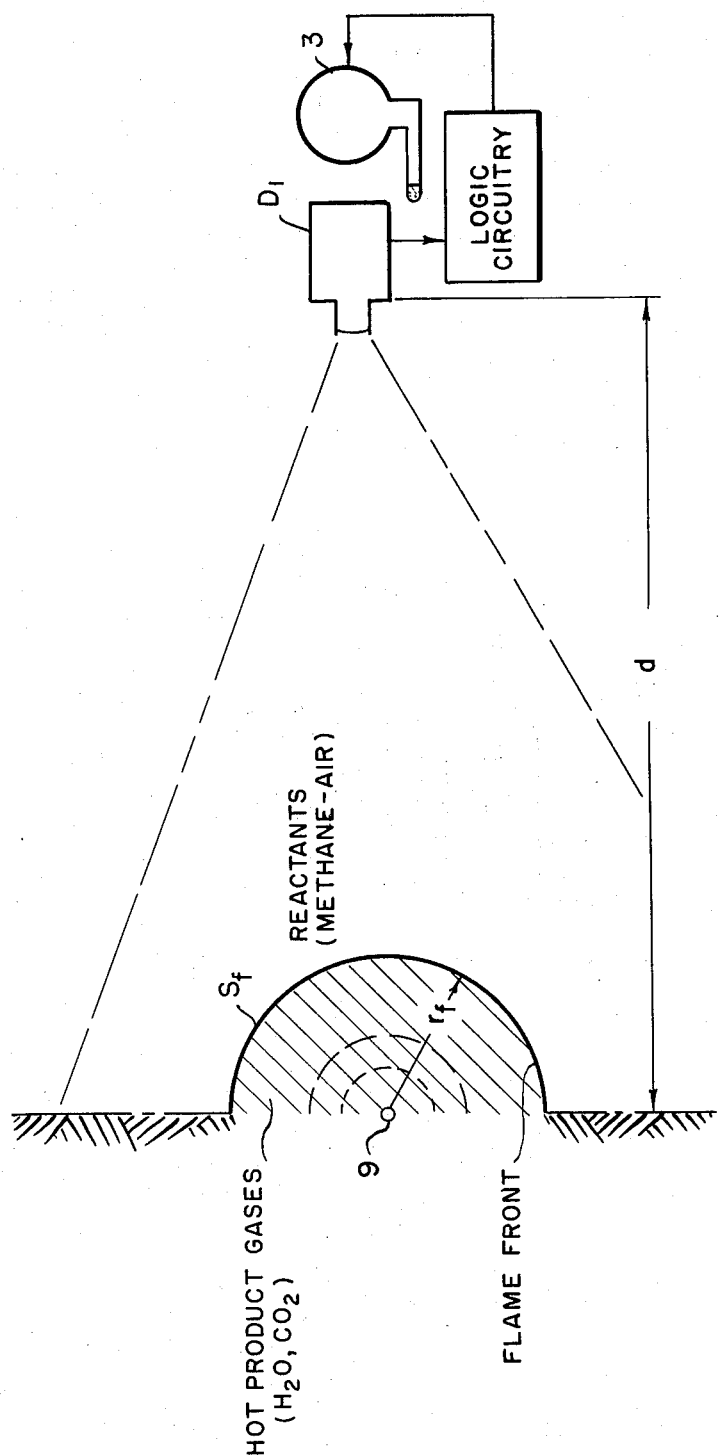

The detection analagrams should be considered in conjunction with the idealized geometry shown in FIG. 2. In that figure, the ignition point 9 can be considered the origin of an expanding spherical flame surface which moves towards the detector $D_1$. The distance $d$ is measured from point 9 to the detector. The raidal distance of the flame surface $r_f$ increases with time. Its surface area $A_f = 4\pi S_f^2 t^2$. If we make the assumptions that the spectral source intensity is characterized by a surface radiance function $F(\lambda)$ and the radius $r_f$ is small compared to the observation distance $d$, the flux or irradiance at the detector is $I_d = F(\lambda) \propto (\lambda,d) r_f^2/d^2$ where $\propto (\lambda,d)$ is the path attenuation factor. The signal amplitude of the detector is then:

(1)
$$i_s = \frac{r_f^2}{d^2} A \hat{d} \int_0^\infty \tau(\lambda, d) F(\lambda) s(\lambda) d\lambda.$$

The value of $i_s$ is expressed in amperes for a photoelectric emissive detector or for a photovoltaric detector with a fixed resistance. $A\hat{d}$ is the effective detector area and $s(\lambda)$ the spectral sensitivity function of the detector in amperes per watt. $F(\lambda)$ would be in watts per cm² of flame surface per micron wavelength-internal. $\tau$(is the filter transmission function.

If 20-40 milliseconds is taken as the maximum detection time, the flame radius $r_f$ would have grown to 5-10 cm by then. Assuming the flame temperature to be 1,800°K and an emissivity as low as $10^-$, the radiant power emitted is 20-80 watts. At a distance of several meters, this power is readily detected by a detector with a high sensitivity $s(\lambda)$ that covers a wavelength region where $F(\lambda)$ is large and where the ambient or stray irradiances aare small.

FIG. 3 is concerned with detection in the ultraviolet; FIG. 4 with detection in the infrared. They are divided into several sectional graphs designated by the letters (a), (b), (c), and (d). Each graph has a common horizontal wavelength axis, which allows comparison to be made of several variables at any given wavelength. The vertical axes of each section differ. The (a) curves show the spectral radiances; the (b) curves show the stray or ambient irradiances; the (c) and (d) curves show the detector responsivities. Now clearly one wishes to choose a wavelength region which maximizes the product of curves (a) and (c), but which minimizes the product of (b) and (c). The key to our invention is to recognize the specific spectral pattern of the explosion radiance and to detect its unique character.

For the ultraviolet and visible regions of the spectrum, the emission from a methane-air explosion is mainly due to excited free radials (OH*, CH* and $C_2$*). For the infrared region, the emission is mainly volume emission from product gases ($CO_2$ and $H_2O$) contained within the expanding shell of the flame zone. FIG. 4 shows the emission peaks in the infrared as being either 4.4 $\mu$ ($10^-$ centimeters) for $CO_2$ or 2.5-2.8 $\mu$ for $H_2O$. In our triple-band detection system, the central band is centered on one of these selective emission peaks and side bands are selected on adjacent sides of this band at shorter and longer wavelengths. It will be noted that the infrared analagram of FIG. 4 depicts a spectrum whose spectral radiance is many orders of magnitude larger than the ultraviolet spectrum shown in FIG. 3. For this and other reasons the infrared was chosen as the region to be most easily detected.

To detect the infrared radiation from the three bands, three detectors are used with appropriate optical filters. The symbol B is used to represent the central band, and A and C are used as the symbols for the two side bands. The band B has an infrared optical filter which transmits only the radiation from the $CO_2$ emission at 4.4 $\mu$ wavelength. Similarly, the side bands A and C contain infrared optical filters which transmit shorter and longer wavelengths, respectively. Band A is centered at about 3.7 $\mu$ and band C at about 5.1 $\mu$.

When the $H_2O$ selective emission system is used, band B is chosen within the limits of 2.5 $\mu$ to 2.8 $\mu$, band A at 2.3 $\mu$ and b and C at 3.5 $\mu$. Thus, one set of three detectors is placed in a position where they respond to different ranges of radiation values. Depending on whether $H_2O$ of $CO_2$ emission is chosen, the values of the ranges will be selected. We will concentrate our discussion on the $CO_2$ spectrum.

To insure that the detectors in the set respond only to the emissions they are set for and are not activated by false signals from cap-lamps, headlights, sunlight, fricitonal sparks, hot surfaces, electric sparks, etc., logical circuitry has been devised to respond to only certain unique combinations of signals. For the $CO_2$ emission detection, the combinations would be as follows: Band B would have to exceed a minimum irradiance in the 4.4 $\mu$ band; the ratio of signal intensity in channel B relative to channel A would have to exceed some minimum value in the order of 2-20; and the ratio of the signal intensity from channel B relative to channel C would exceed some minimal value that is in the order of 2-20. Mathematically these conditions are expressed as:

B> minimum radiance; $2 \leq B/A \leq 20$; $2 \leq B/C \leq 20$.

As is apparent all this means is that at 4.4 $\mu$ wavelength there is a peak; with little or no energy in the side bands at 3.7 $\mu$ and 5.1 $\mu$.

FIG. 5 illustrates the type of logical circuitry which was initially used to process the three signals from the three detectors. Still assuming the $CO_2$ spectrum is chosen as the one to be observed, the filtered analog voltage signals ($V_1, V_2, V_3$) representative of the intensity of the radiation detected are first amplified by amplifiers $A_1, A_2,$ and $A_3,$ respectively. Resistors $R_1$ and $R_4$ operate in conjunction with amplifier $A_1$ to amplify the input for detector B. Amplifier $A_2$ in operation with resistors $R_2$ and $R_{11}$ amplifies input A and amplifier $A_3$ along with resistors $R_3$ and $R_{14}$ amplifies input C. The resistors $R_5, R_6$ with amplifier $A_4$ act to invert the amplified signal received from amplifier $A_1$. This inverted signal is next sent to the threshold detector made up of comparator $C_1$ and the three resistors $R_7, R_8,$ and $R_9$. When the input signal to detector B exceeds some present value level, the output voltage from comparator $C_1$ is set to go from 5 volts to zero. For band A comparator $C_2$ along with its associated resistors $R_{10}$ and $R_{12}$ constitute a ratio detector for the inputs from detectors A and B. When the ratio (B/A) of the inputs from B and A exceeds some preset level (like the $2 \leq B/A \leq 20$ previously mentioned), the output from comparator $C_2$ goes from 5 volts to zero. The other comparator $C_3$ along with its two associated resistors $R_{13}$ and $R_{15}$ comprise a ratio (B/C) detector for the input voltages from detectors B and C. When this B/C ratio exceeds a preset value (see previous note on B/A) the output from comparator $C_3$ also goes from 5 volts to zero volts.

Continuing with the explanation of the logic circuit of FIG. 5, the three logic gates G1, G2, and G3 are selected to perform the Boolean relationship $\overline{C_1 + C_2 + C_3}$ = output of G3. Verbally, this means if any of the outputs from comparator $C_1$ or comparator $C_2$ or comparator $C_3$ are positive (i.e., not zero) then gate G3 is not actuated. To actuate gate G3 all of the outputs from comparators $C_1, C_2,$ and $C_3$ must be zero volts. Upon actuation, gate G3 outputs at 5 volts, which has been arbitrarily chosen as the binary 1 activating voltage.

Figure 1:
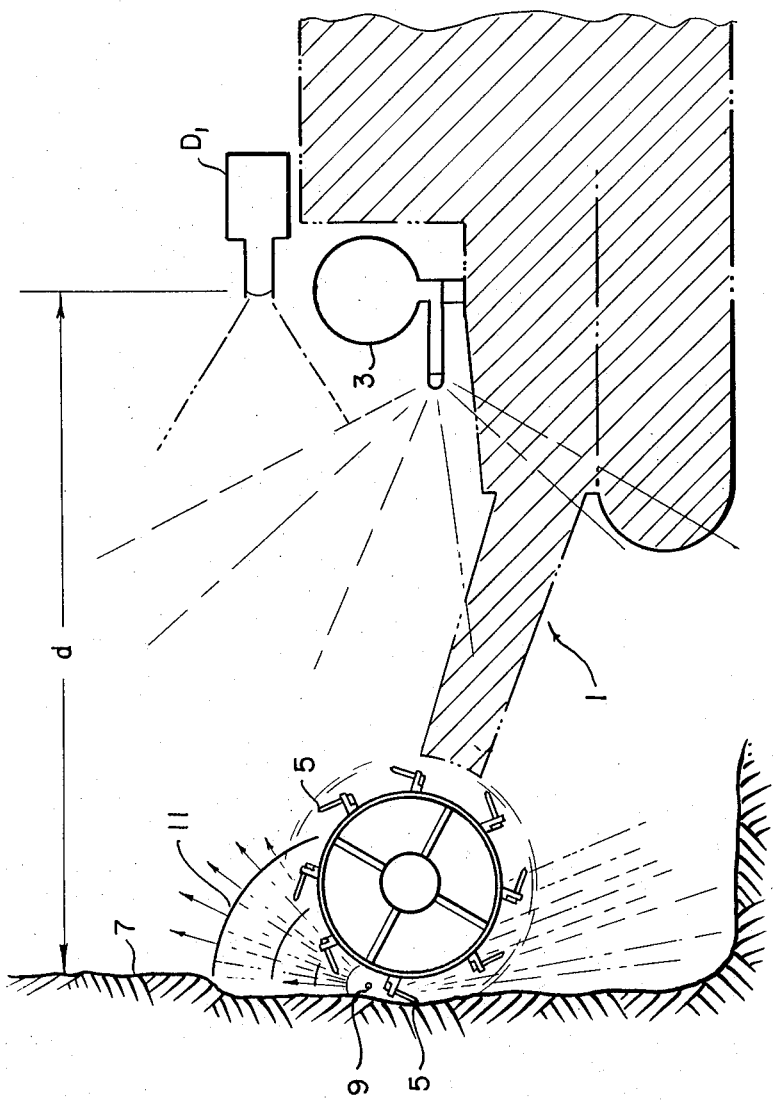

This 5 volt output from gate G3 then causes current to surge through inductance coil I which in turn actuates relay Ro which controls an attached mechanism—like the dispersal nozzle 3 described with respect to FIG. 1 and FIG. 2. Although the details of the circuitry connected to relay Ro is not shown, it can take a variety of forms to accomplish a variety of purposes. FIG. 1 has been illustrated and discussed to disclose just one of the uses the closing of the relay can be put to.

The choice of the right detector to accomplish the detection needed was one problem we had to consider. The detectors would have to supply the signals $V_1$, $V_2$, $V_3$ of FIG. 5 rapidly and not be activated by noise or background current. Expressed differently, the intrinsic time constant of the detector should be much faster than the time it takes for the explosion to reach the nozzle of the dispensing device 3 of FIG. 1 and the signal current of the detected explosion irradiance should be much larger than the noise or background current when the flame radius 11 is still small compared to distance d to the nozzle. To put this problem in its proper perspective with respect to FIG. 1, if the distance d is one meter, the flame zone 11 of an unconfined, stoichiometric, methane-air explosion would travel at a speed of 300 cm/sec. and thereby engulf the nozzle 3 in a time of 400 milliseconds. The critical time interval of extinguishment is, therefore, shorter than 400 milliseconds and the detection phase is ideally less than 20-40 milliseconds.

For the detection of irradiance from the $CO_2$ emission mentioned, experiments and theory suggest that a photoconductive lead selenide detector sensitive to the 4.4 $\mu$ wavelength appeared to be the best room temperature detector which had the rapid response time needed. Optical filters are placed in front of the detectors such that only radiation for the band desired is transmitted to the detector. For example, if $CO_2$ is to be observed for the band B, only radiation from the 4.4 $\mu$ emission band would be transmitted; for band C, only 5.1 $\mu$ radiation would be transmitted; and for band A, only 3.7 $\mu$ radiation would be transmitted. As already described, these filtered signals are amplified by the FIG. 5 circuitry which responds only to a selectively emitting source.

In the FIG. 6 embodiment a graphical representation is shown in conjunction with electronic circuitry to get a better understanding of how the invention operates. The graphical representation consists of two graphs showing how spectral radiance and filter transmission percentage vary with the wavelength, which is the ordinate axis on both graphs. The upper graph is really a plot of the measured energy emitted at different wavelength of the spectrum. As noted the peak spectral energy occurs at a wavelength in the infrared region of about $4.4 \times 10^{-4}$ cm. This spectral peak and its adjacent side energy bands, both lower and higher than the peak, is unique to an explosion from a methane-air gaseous mixture. Another way of describing this uniqueness is to say it is the characteristic signature for the methane-air explosion. Other sources of radiation could conceivably have radiance at about the same wavelength but their side bands would not dip off as do the side bands for the methane-air explosion, i.e., their characteristic signatures would differ. Usually these other sources of radiation would emit a more continuous spectrum. This uniqueness of a characteristic signature allows us to set up appropriate optical detecting devices and electronic circuitry to eliminate all but the true occurrence. The lower graph of FIG. 6 shows the optical filter transmission efficiency for each band. As observed each of the filters A, B, and C, associated with the wavelength bands and optical detectors designated by the same letters, have a peak filter transmission of about the same percentage. The detector signal is determined by the product of the two graphs. As will be described, triggering takes only if the detected intensity in band B exceeds the sum of the intensities for bands A and C.

FIG. 6 is the final, simplified embodiment of the optical and electrical detection system. The three detectors A, B, and C are placed in a single bridge circuit. The detector C' is also of the photoconductive lead selenide type. When the bridge is initially balanced in the absence of any radiant energy input, the input voltage across it is zero. As radiant energy is detected to unbalance the bridge circuit, the transmitted input irradiance for the detectors A, B, and C are, respectively, $I_A$, $I_B$, and $I_C$. The output voltage Vo in the imbalanced state would be approximately $$Vo = KV_1/4\ [I_B - (I_A + I_C)]$$

where K is a constant proportional to the responsivity of the matched detectors. From this relationship it is apparent that Vo will have a positive value only when $I_B > I_A + I_C$. A comparison of this condition with the previously mentioned radiation levels that were to be detected for actuation using the FIG. 5 circuitry shows harmony of conditions. Actually the condition of $I_B > I_A + I_C$ needed to actuate the circuitry of FIG. 6 is not fully equivalent to the conditions needed to actuate the circuitry of FIG. 5. The conditions for activating the FIG. 5 circuitry are a little more stringent.

Perhaps it would be helpful to look at the relationship between the bridge input voltage (V input) and its output voltage Vo more closely. Mathematically this relationship can be shown to be:

(2) $\quad Vo = V\text{ input}/4\ [\eta_B - (\eta_A + \eta_C)]$ where $\eta$ for a given detector is:

(3) $\quad \eta_i = \dfrac{r_f^2}{d^2} A \hat{d} \int_0^\infty \propto(\lambda, d) F(\lambda), \tau, (\lambda) s(\lambda) d\lambda$ $r_f$ being the radius of the flame front, d the distance between the point of ignition and optical detector, $A\hat{d}$ the area of the detector facing the radiance, $\propto (\lambda, d)$ the path attenuation factor, F (the spectral radiance shown in the upper graph of FIG. 6, $\tau(\lambda)$ the filter transmission factor shown in the lower graph of FIG. 6, and $s(\lambda)$ the detector sensitivity. This is the same expression as equation (1) except for the filter transmittion. $\propto (\lambda, [d])$ measures the radiance loss in transmission, and is less than 1 (usually about 0.95). $s(\lambda)$ is the sensitivity of the detector per unit power input. Of all these terms, $F(\lambda)$ would be the controlling variable based on the detected spectral radiant energy.

The embodiment of FIG. 6 is operated by placing the four detectors shown in the four arms of the Wheatstone bridge. With interference infrared optical filters in front of detectors A, B, and C, only the predetermined desired range of wavelengths is allowed to impinge on these detectors. Detector C' is covered so that no radiation is incident upon it. If the change in resistance caused by the spectral irradiance on detector B exceeds the sum of the changes in resistance of detectors A and C (i.e., $I_B > I_A + I_C$), a positive signal would appear across the bridge output terminal. The emitter or cathode follower $A_5$ relays the bridge output signal to amplifier $A_6$. This amplified signal is then sent to operational amplifier $A_7$ which triggers the relay shown, after passing through diode $D_2$, if the signal exceeds some preset value. Variable resistor $R_{20}$ is used to adjust the particular preset value for the amplifier $A_7$.

One minor point is worthy of note with respect to the detectors used in the bridge circuit of FIG. 6. Detector $C'$ is used instead of a fixed resistor in order to equally compensate for thermal drift in all detectors.

A further more detailed description of the operation of the FIG. 6 circuitry is in order. When the input irradiance at the three detectors A, B, and C is such that the bridge is unbalanced and the condition $I_B > I_A + I_C$ occurs, a positive input voltage will appear at the positive terminal of emitter follower amplifier $A_5$. To insure that the gain is known for the positive signal from the bridge is passed through an emitter-follower. The bridge circuit sends out a very high impedance signal which is changed by emitter follower $A_5$ to a low impedance signal voltage Vo as the signal from the bridge circuit. At amplifier stage $A_6$ it is amplified by a gain factor ($\simeq 1,000$) and inverted. Amplifier $A_7$ serves as a comparator-trigger. Its output is either the positive or negative of its supply voltage depending upon whether the input voltage exceeds a preset value. The output of $A_6$ serves as the input voltage for $A_7$. The preset value with which it is compared is controlled by the variable resistor $R_{10}$, $R_{20}$. If the amplified signal exceeds (is more negative than) the comparison voltage, then the output of $A_7$ is the negative of its supply voltage. If the amplified signal is less, the output of $A_7$ is the positive of its supply voltage. The reversed biased diode $D_2$ will conduct current only when the output of comparator trigger $A_7$ is negative. The relay will, in turn, only operate when $D_2$ conducts. Hence, the relay activates only when $|1000\ Vo| > |\text{comparison voltage}|$ which is the same as $I_B > I_A + I_C$.

Whether the circuitry of FIG. 5 of FIG. 6 is used, the same result may be accomplished. By observing the spectral characteristics of a given explosion and contrasting it with the characteristics of the background radiation, we have been able to use a multidetector system to detect spectral peaks unique to the type of explosion under observation. When the right combination of readings occur on the detectors, some type of device, like a relay, is actuated. This actuation can then be used for whatever purpose is desired whether it be to operate a suppressor device, an alarm, a movable barrier, etc.

None of the specifically desclosed apparatus or method steps should be used to limit the scope and extent of this invention which is to be measured only by the scope of the claims which follow.

We claim:

1. A method for detecting and suppressing a gas-air explosion comprising the steps of:
    first, predetermining the specific characteristic signature for the explosion spectrum of the gas-air mixture under observation and noting its spectral peak bank and adjacent side bands;
    second, detecting the spectral irradiance incident on a plurality of optical detectors operating in the same radiant energy spectrum as said predetermined characteristic signature; and comparing the detected irradiance with said characteristic explosion signature; and
    actuating an explosion suppression device to suppress said gas-air explosion when said comparing step indicates the detected irradiance and the predetermined characteristic signature fulfill basic predetermined matching conditions.

2. The method of claim 1 wherein said detecting step detects the upper and lower adjacent wavelength bands of said spectral peak band.

3. Apparatus for detecting an explosion of a gaseous mixture comprising: a plurality of optical detectors each of which is sensitive to different radiation energy levels of the particular gaseous mixture under observation; and circuit means operatively connected to said detectors for actuating a triggering device when a preselected combination of detector readings are sensed that correspond to the characteristic signature of an explosion for said gaseous mixture under observation.

4. The apparatus of claim 3 wherein each of said detectors has an optical filter to prevent the transmission of radiant energy levels to its detector other than those required to make up the desired preselected combination.

5. The apparatus of claim 3 wherein said circuit means comprises logic gating circuitry to sense that said preselected combination of detector readings has been detected.

6. The apparatus of claim 3 wherein said plurality of optical detectors are arranged in a wheatstone bridge circuit configuration with the output signal of said bridge being a function of the detected radiant energy ratios.

7. The apparatus of claim 4 wherein said plurality of optical detectors are interconnected to form a bridge circuit with the output signal from said bridge being a function of the detected radiant energy and the filter transmission percentages for each detector and its filter.

8. The apparatus of claim 3 wherein said preselected combination of detector readings are determined by the energy levels of the spectral peak for said characteristic signature and at least two adjacent side energy bands of said spectral peak.

* * * * *